(12) United States Patent
Ji

(10) Patent No.: US 6,277,017 B1
(45) Date of Patent: Aug. 21, 2001

(54) DIAMOND TIP DISK SAW

(76) Inventor: Beom Hyun Ji, 225-507 Guwoljugong APT, 24 Guwol-dong Namdong-gu, Inchon 405-220 (KR)

( * ) Notice: Subject to any disclaimer, the term of this patent is extended or adjusted under 35 U.S.C. 154(b) by 0 days.

(21) Appl. No.: 09/403,785
(22) PCT Filed: Jan. 15, 1999
(86) PCT No.: PCT/KR99/00021
 § 371 Date: Nov. 5, 1999
 § 102(e) Date: Nov. 5, 1999
(87) PCT Pub. No.: WO99/44797
 PCT Pub. Date: Sep. 10, 1999

(30) Foreign Application Priority Data

Mar. 7, 1998 (KR) .................................................. 98-7584

(51) Int. Cl.$^7$ .................................................. B23F 21/03
(52) U.S. Cl. ............................. 451/547; 125/15; 451/548
(58) Field of Search ................................ 451/541, 542, 451/546, 547; 125/13.01, 13.02, 15, 22; 83/835

(56) References Cited

U.S. PATENT DOCUMENTS

| 4,337,750 | * | 7/1982 | Dutcher | 125/15 |
| 4,461,268 | | 7/1984 | Inoue . | |
| 4,624,237 | * | 11/1986 | Inoue | 125/15 |
| 4,821,617 | * | 4/1989 | Fjelkner et al. | 83/835 |
| 5,876,274 | * | 3/1999 | Hariu | 451/547 |

* cited by examiner

Primary Examiner—Timothy V. Eley
Assistant Examiner—Dung Van Nguyen
(74) Attorney, Agent, or Firm—John K. Park; Park & Sutton LLP

(57) ABSTRACT

The invention relates to a diamond tip disk saw that does not vibrate during high-speed rotation, enhance the quality of the cut surface, and increase the durability of the saw. The diamond tip disk saw according to the invention comprises of a metal disk having a shaft hole and a plurality of diamond tips on both sides of the periphery. In between the shaft hole and the diamond tips, the saw is provided with a plurality of corrugations forming substantially sinusoidal waves on both sides of the saw. A greater efficiency is obtained when the corrugations are formed in a convex arc coming out of the disk surfaces.

18 Claims, 4 Drawing Sheets

DIAMOND TIP DISK SAW

TECHNICAL FIELD

The invention relates to a diamond tip disk saw, and more particularly to a diamond tip disk saw which does not vibrate during high speed rotation and could enhance the quality of cutting surface of works and higher durability of the machine.

BACKGROUND OF THE INVENTION

The diamond tip disk saw is a tool composing of a metal disk and diamond tips attached on the periphery of the metal disk and used for cutting or grinding the hard material such as stones. FIG. 1 shows the conventional diamond tip disk saw, in which the metal disk has the diamond tips along the periphery of it. These diamond tips are made by sintering the mixture of diamond particles and metal powders and by bonding or welding the mixtures onto the metal disk. And between the adjacent diamond tips there are provided recessed grooves(14). And on the middle part of the metal disk(10), there are provided curved corrugations(16), the recess part of which connects to the groove(14). The corrugation(16) may enhance the rigidity of metal disk and bring about the radially outward air flows which may exhaust the heats and chips generated during the cutting operation. And in case that a plurality of metal disks(10) are overlapped to each other, the adjacent corrugations(6) will form the paths through which the heats and chips are exhausted. On sintering process of diamond tip(12) onto the metal disk(10) or on press forming process of the corrugation(16), the metal disk(10) will be put into the heat treatment to improve the hardness or other properties.

The corrugations(16) of the disk(10) extend from the middle part of disk(10) to the grooves(14) of periphery as they are gradually widen. So, If the outer part of the corrugation(16) is damaged by scratches or by any external forces during cutting operation, the thickness of the outer part of the disk(10) will become non-uniform, and the weight distribution of the disk(10) will also become unbalanced. This non-uniformity of the weight distribution will cause the considerable vibration of disk at high speed rotation. Therefore, the precise machining would not be attainable, and the apparatus may easily get into a breakdown.

Moreover, it will be possible that the disk saw may be non-uniformly deformed by heating or cooling during heat treatment process. This deformation will make the cutting surface of works rough, lowers the quality of products, increases the operation noises, and eventually will result in the breakdown of the disk. Therefore, it is necessary to check the deformation of the disk by test operation with a tester which is equipped with a dial gauge and, if necessary, correct the deformation by striking or pressing the surface of disk after it is firstly formed and heat-treated. But, in the conventional disk saw such as in FIG. 1, the corrugation extends to the outer part of the disk, so the deformation check is difficult because of uneven corrugation, and even though it is possible to check the deformation, the correction of deformation is difficult due to the rigidity, and the deformation of corrugation damaged during use could not be easily cured.

SUMMARY OF THE INVENTION

The invention is to solve the above mentioned problems of disk saw, and the object of the invention is to provide a new diamond tip disk saw which is capable of high speed and precise cutting or grinding with reduced vibration, and is also capable of easy correction of deformation after it has been formed and heat-treated, so that it could achieve high quality work and enhance the durability.

According to the invention, there is provided a diamond tip disk saw which is composed of metal disk having a shaft hole and a plurality of diamond tips on both sides of the periphery, and said disk being made through heat treatment, wherein on the intermediate part between said shaft hole and the diamond tip there is provided a corrugation extending radially, and between the corrugation and the diamond tip there is provided a correction part which has no corrugation, and there are provided a plurality of reinforcing tips disposed on the radially inner part of the diamond tip.

BRIEF DESCRIPTION OF THE DRAWINGS

Although the present invention is briefly summarized, the fuller understanding of the invention can be obtained by the following drawings, detailed description and appended claims.

DETAILED DESCRIPTION OF THE INVENTION

Figure 1:
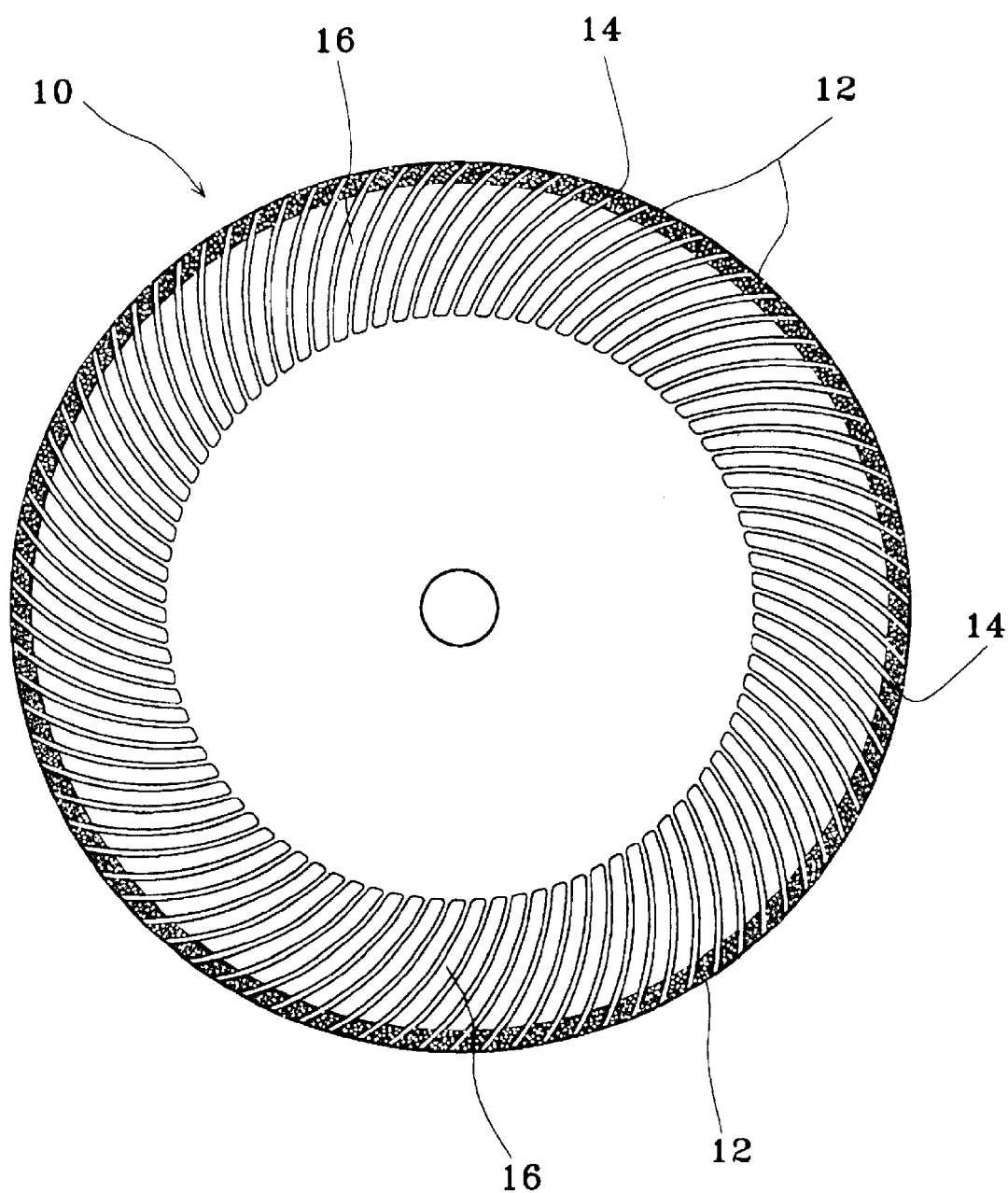
FIG. 1 shows a conventional diamond tip disk saw.
Figure 2:
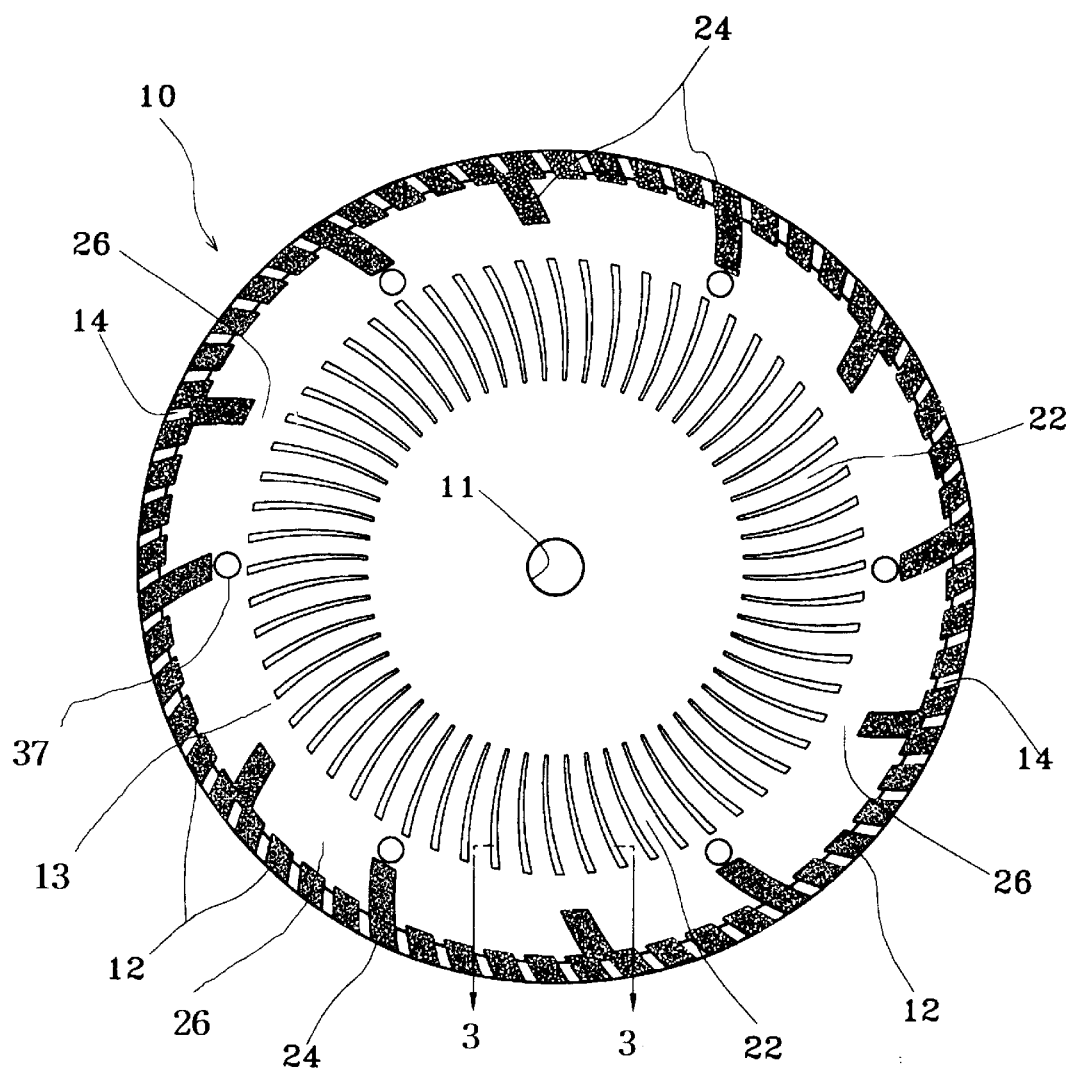
FIG. 2 shows a preferred embodiment of the invention.
Figure 3:
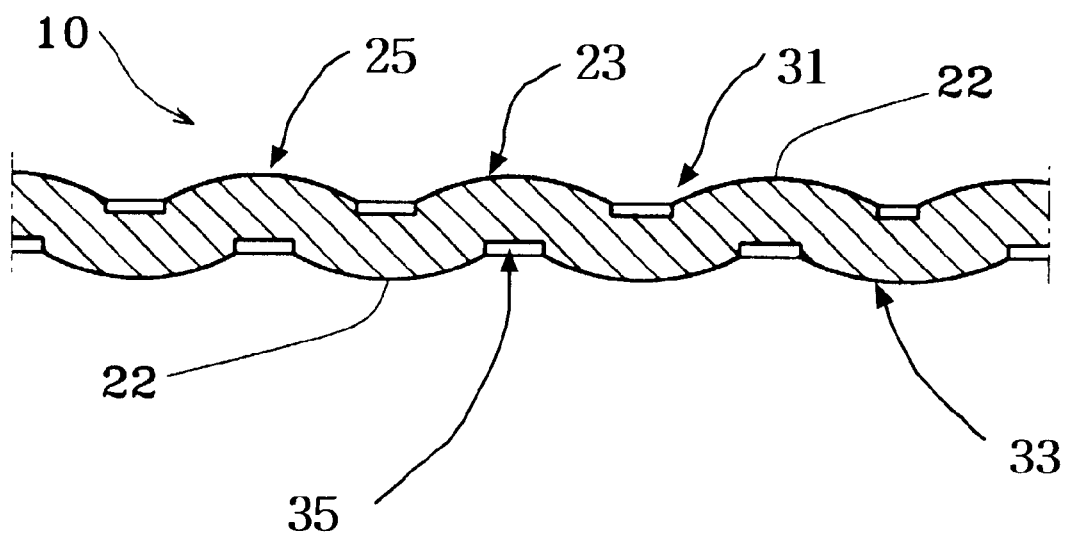
FIG. 3 shows a section taken along the line 3—3 of FIG. 2.

Preferred embodiments of the invention will be explained below with reference to the drawings. FIGS. 2 and 3 show the preferred embodiment of the invention, in which the steel disk(10) with a center shaft hole(11) has a plurality of diamond tips(12) along the edge periphery of it. Grooves (14) are formed between each diamond tip(12). The diamond tip(12) is made by sintering and welding the mixture of diamond particles and metal powders onto the disk(10). And a plurality of reinforcing tips(24) are extending inwardly from the inner part of diamond tips(12) with a predetermined interval. The number of reinforcing tips(24) is fewer than that of diamond tips(12), but the shape of reinforcing tips(24) is similar to that of diamond tips(12). The main function of the reinforcing tip(24) is to reinforce the periphery of disk(10) rather than to cut or grind.

In the intermediate section(13) between shaft hole(11) and diamond tip(12) or reinforcing tip(24), there are provided corrugations(22) which are curved and radially extending, but they are apart from the diamond tips(12). These corrugations(22) may enhance the rigidity of the disk(10) and cause rapid air flow between the rotating disks(10) so that the heat or chips generated in operation should be rapidly exhausted.

Figure 4:
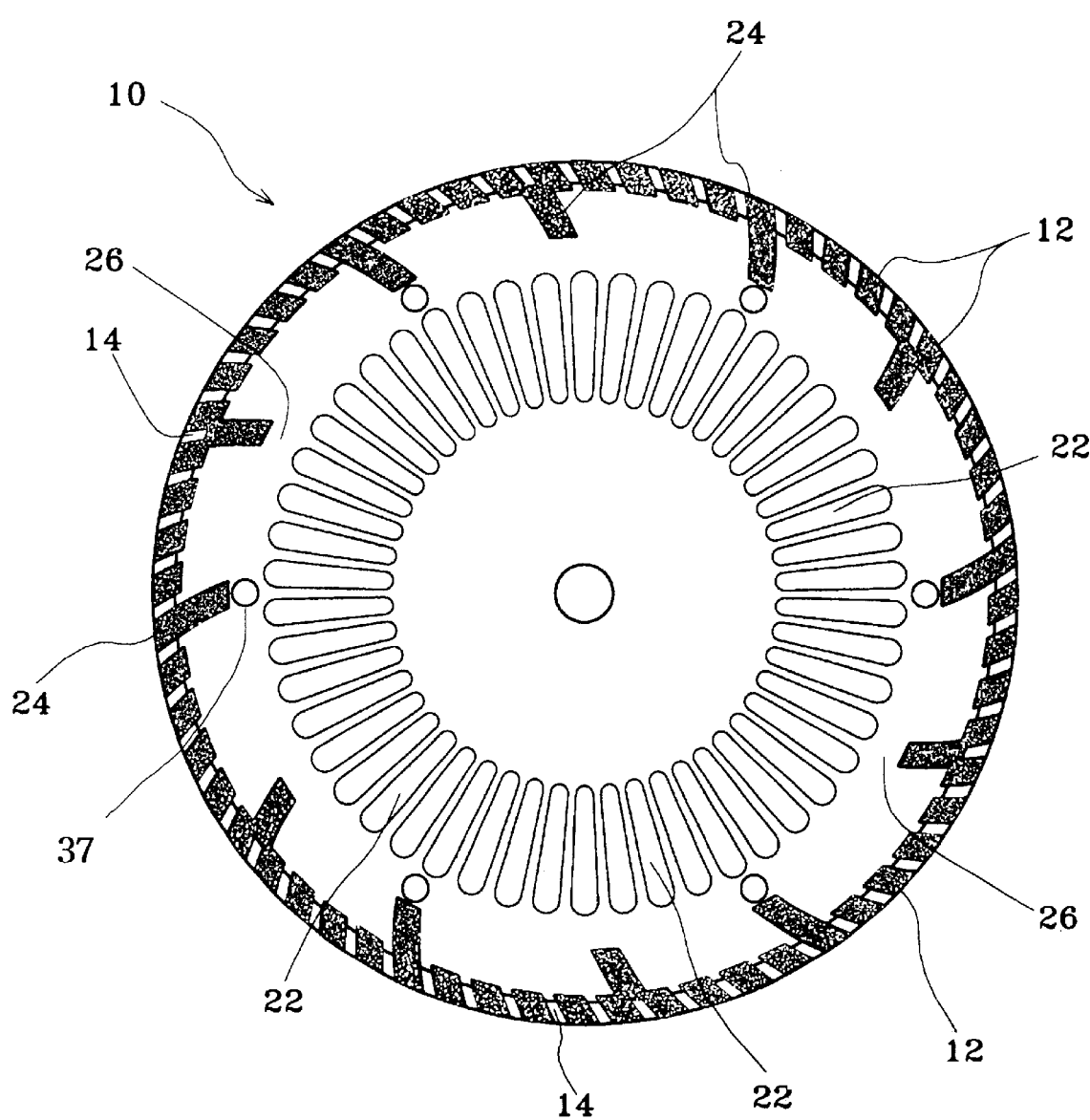
FIG. 4 shows another preferred embodiment of the invention.

The corrugations(22) can be shaped in a various ways. FIG. 2 shows each of the corrugations(22) forms an arc over the length of the corrugation(22) as each corrugation(22) extends radially from the shaft hole. In contrast, FIG. 4 illustrates another version of this invention in which corrugations(22) do not form arcs over the length of the corrugations(22). Moreover, FIG. 3 illustrates that the corrugation surface(23) forms a smooth convex arc(25). Due to these smooth convex arcs(25) formed by the corrugation surfaces(23), the plurality of corrugations(22) form a substantially sinusoidal wave on at least one of the front disk surface(31) or the rear disk surface(33) when viewed through a cross-section (section 3—3) about the plurality of corrugations(22).

In between corrugations(22), FIG. 2 shows a plurality of indentation slots(35). These indentation slots(35) are placed between two adjacent corrugations(22), and generally follow the curvature, an arc or a straight, of the length of the corrugations(22). As these indentation slots(35) are used, along with, the corrugations(22) to cool and to force debris from the cutting, the preferred embodiment has one indentation slot(35) between each adjacent corrugations(22).

FIG. 2 also shows the correction section(26) having a plurality of through holes(37) substantially smaller than the shaft hole(11). The plurality of through holes(37) on the correction section(26) are placed between the corrugations(22) and the reinforcing tips(24). For the best performance of the disk saw(10), a through hole(37) is placed between the corrugation(22) and the reinforcing tip(24) at every other reinforcing tip(24).

The outer end of these corrugation(22) has sufficient distance from the reinforced tips(24) as well as diamond tips(12). This part between the corrugation(22) and diamond tip(12) is substantially flat and forms the correction section(26). Because the outer end of the corrugation(22) does not extend as far as to the diamond tip(12), the weight unbalance of the disk periphery can be reduced so that the vibration could be advantageously reduced in high speed rotation. Moreover, because there is provided a flat correction section(26) between the corrugation(22) and diamond tip(12), it will be easy to correct the deformation detected during the test rotation after it is formed and heat-treated. By striking or pressing the appropriate portions of the correction section(26) of the disk(10), the deformation can be eliminated and the weight distribution can be better balanced. And the deformation caused at the time of use may also be corrected by striking or pressing the appropriate portions of the correction section(26). As a result, the quality of cutting surface of the cut material would be better maintained, the probability of breakdown may be reduced and the durability of the machine may be increased.

FIG. 4 shows another preferred embodiment, which has radially extending straight corrugation(22) instead of curved corrugation.

As described above, the disk saw of the invention could enhance the rigidity of disk(10) by providing the reinforced tips(24) on the inner part of the diamond tips(12) and the corrugation(22). But as the corrugation(22) does not extend to the periphery of the disk(10) to secure the space for the flat correction section(26), the vibration of high speed rotation causing the inevitable dimension error of corrugation(22) could be efficiently prevented, and the deformation of the heat-treated disk(10) can be better corrected, and the deformation by the damage from an extended use may be also better cured. Therefore, the quality of the cutting or grinding will be highly improved and the durability of the machine will be also enhanced.

Although the invention has been described in considerable detail, other versions are possible by converting the aforementioned construction. Therefore, the scope of the invention shall not be limited by the specification specified above and the appended claims.

What is claimed is:

1. A diamond tip disk saw composed of a metal disk having a front disk surface and a rear disk surface, a shaft hole and a plurality of diamond tips, wherein the metal disk is made through heat treatment, wherein the disk saw comprises of
   a) an intermediate section between the shaft hole and the plurality of diamond tips having a plurality of corrugations extending radially, wherein the plurality of corrugations form a substantially sinusoidal wave on at least one of the front disk surface or the rear disk surface when viewed through a cross-section about the plurality of corrugations;
   b) a correction section between the plurality of corrugations and the plurality of diamond tips, wherein the correction section does not contain any corrugations; and
   c) a plurality of reinforcing tips disposed on the radially inner part of the plurality of diamond tips.

2. The diamond tip disk saw of claim 1 wherein the substantially sinusoidal wave formed by the plurality of corrugations are on both the front disk surface and the rear disk surface when viewed through a cross-section about the plurality of corrugations.

3. The diamond tip disk saw of claim 2 wherein the correction section has a plurality of through holes substantially smaller than the shaft hole.

4. The diamond tip disk saw of claim 3 wherein the plurality of through holes on the correction section are placed between the corrugations and the reinforcing tips.

5. The diamond tip disk saw of claim 4 wherein the through hole on the correction section is placed between the corrugation and the reinforcing tip at every other reinforcing tip.

6. A diamond tip disk saw composed of a metal disk having a front disk surface and a rear disk surface, a shaft hole and a plurality of diamond tips, wherein the metal disk is made through heat treatment, wherein the disk saw comprises of
   a) an intermediate section between the shaft hole and the plurality of diamond tips having a plurality of corrugations extending radially, having an indentation slot placed in between two adjacent corrugations, and the corrugation surface forms a smooth convex arc;
   b) a correction section between the plurality of corrugations and the plurality of diamond tips, wherein the correction section does not contain any corrugations; and
   c) a plurality of reinforcing tips disposed on the radially inner part of the plurality of diamond tips.

7. The diamond tip disk saw of claim 6 wherein the indentation slot is place in between each of two adjacent corrugation pairs.

8. The diamond tip disk saw of claim 7 wherein the plurality of corrugations form a substantially sinusoidal wave on at least one of the front disk surface or the rear disk surface when viewed through a cross-section about the plurality of corrugations.

9. The diamond tip disk saw of claim 8 wherein the substantially sinusoidal wave formed by the plurality of corrugations are on both the front disk surface and the rear disk surface when viewed through a cross-section about the plurality of corrugations.

10. The diamond tip disk saw of claim 9 wherein the correction section has a plurality of through holes substantially smaller than the shaft hole.

11. The diamond tip disk saw of claim 10 wherein the plurality of through holes on the correction section are placed between the corrugations and the reinforcing tips.

12. The diamond tip disk saw of claim 11 wherein the through hole on the correction section is placed between the corrugation and the reinforcing tip at every other reinforcing tip.

13. A diamond tip disk saw composed of a metal disk having a front disk surface and a rear disk surface, a shaft hole and a plurality of diamond tips, wherein the metal disk is made through heat treatment, wherein the disk saw comprises of
- a) an intermediate section between the shaft hole and the plurality of diamond tips having a plurality of corrugations extending radially, wherein the plurality of corrugations form a substantially sinusoidal wave on at least one of the front disk surface or the rear disk surface when viewed through a cross-section about the plurality of corrugations, and wherein each of the corrugations forms an arc over the length of the corrugation as each corrugation extends radially from the shaft hole;
- b) a correction section between the plurality of corrugations and the plurality of diamond tips, wherein the correction section does not contain any corrugations; and
- c) a plurality of reinforcing tips disposed on the radially inner part of the plurality of diamond tips.

14. The diamond tip disk saw of claim 13 wherein the substantially sinusoidal wave formed by the plurality of corrugations are on both the front disk surface and the rear disk surface when viewed through a cross-section about the plurality of corrugations.

15. The diamond tip disk saw of claim 14 wherein the intermediate section further has an indentation slot placed in between two adjacent corrugations.

16. The diamond tip disk saw of claim 15 wherein the indentation slot is place in between each of two adjacent corrugation pairs.

17. The diamond tip disk saw of claim 16 wherein each of the indentation slots forms an arc along the length of the corrugation as each corrugation extends radially from the shaft hole.

18. The diamond tip disk saw of claim 17 wherein the correction section has a plurality of through holes substantially smaller than the shaft hole.

\* \* \* \* \*